C. H. MILLER.
TRACTION WHEEL.
APPLICATION FILED MAY 10, 1913.

1,149,936.

Patented Aug. 10, 1915.

Witnesses.
J. H. Byers
W. E. Miller.

Inventor.
Charles H. Miller

UNITED STATES PATENT OFFICE.

CHARLES H. MILLER, OF LIBERTYVILLE, IOWA.

TRACTION-WHEEL.

1,149,936.  Specification of Letters Patent.  Patented Aug. 10, 1915.

Application filed May 10, 1913. Serial No. 766,735.

*To all whom it may concern:*

Be it known that I, CHARLES H. MILLER, a citizen of the United States, residing near Libertyville, in the county of Jefferson and State of Iowa, have invented certain new and useful Improvements in Traction-Wheels, of which the following is a specification.

My invention relates to improvements in traction wheels.

The objects of my improvements are, first, to devise a wheel rim with openings therein which will not ordinarily become clogged with trash and soil; second, to provide a form of wheel rim which will readily pass through the loose surface and engage the firm soil beneath without unnecessary consumption of power; third, to secure the necessary strength with soil and trash excluding features in the web of the wheel, thus insuring constant light weight and economy in operation; and fourth, to devise a wheel which may be repaired by the country blacksmith with the tools usually found in his shop.

I attain these objects and others by the construction illustrated in the accompanying drawings, in which,—

Figure 1:
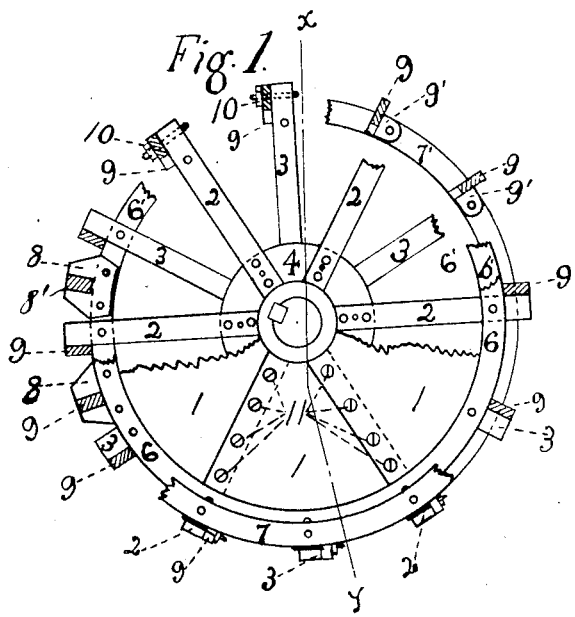
Figure 2:
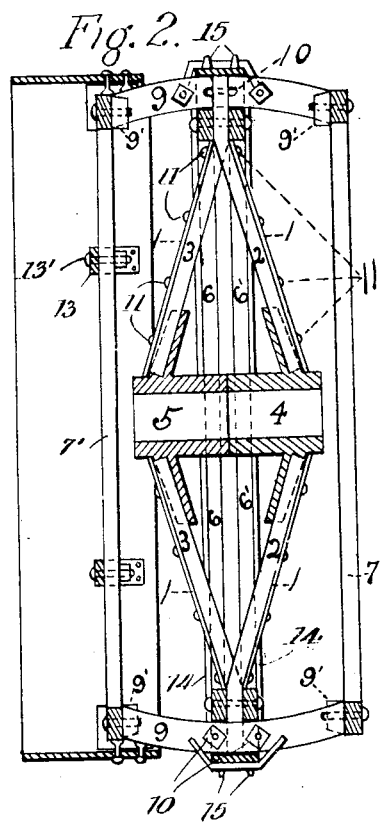
Figure 3:
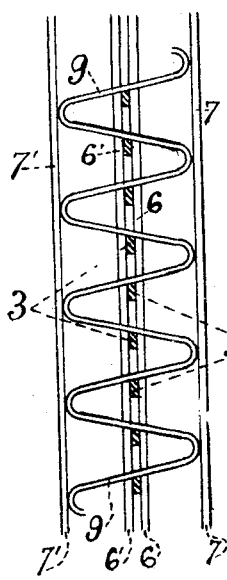
Figure 4:
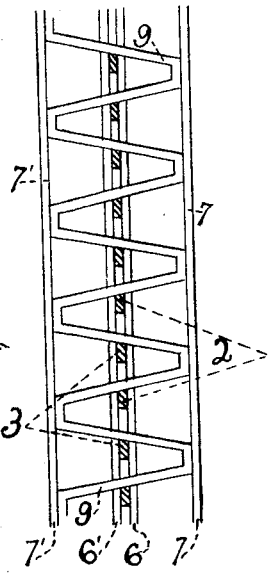
Figure 5:
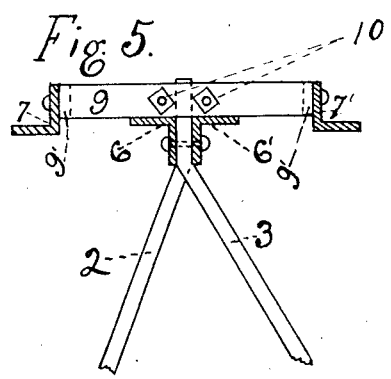

Figure 1 is a side elevation of the wheel, represented partly in broken section; to show more plainly the different parts. Fig. 2 is a cross sectional view of the wheel, taken on the line *x—y* of Fig. 1. Figs. 3 and 4 represent the edges of two forms of continuous bent flat bar traction blades which may be used with or without the outer rims shown. Fig. 5 is a cross section, through the rim, showing modified rings made of angle steel instead of flat bars.

Similar numerals refer to similar parts throughout the several views.

The mud and trash deflecting plates 1, are attached to the outside of each series of spokes by machine screws 11. Each plate overlaps the next one sufficiently to permit both plates to be secured to the spoke by one set of screws. The set of spokes 2 rest in grooves in the flange of the hub member 4 to which they are riveted. The set of spokes 3, are likewise attached to the other hub member 5. The two hub members 4 and 5 are similar in construction, excepting the keyseats which are so placed as to stagger the two sets of spokes and have properly beveled flanges with grooves in them for the spokes to rest in. The two series of spokes 2 and 3, converge toward the same plane, which ordinarily passes through the center of the hub and divides the wheel rim into two equal parts. For convenience in attaching the traction blades 9, the spokes are made to pass between and beyond the two inner and smaller rings 6, 6' forming members of the wheel rim to which they are riveted. When the rim is directly over the center of the hub the spokes are all interchangeable. The two outer and larger rings 7 and 7' are used as rim members to secure greater strength and rigidity. The traction blades 9 are by preference equal in number with the spokes of both series. Each blade is slightly arched as best seen in Fig. 2 so that its center overlies the inner rings 6 and 6' and its ends which abut the inner faces of the outer rings 7 and 7' may be deflected into ears 9' riveted to these outer rings as shown. However, instead of individual blades, I may employ a serpentine metal band as shown in Fig. 3, or I may adopt the construction shown in Fig. 4—the ends of each convolution being riveted to the side rings and therefore forming the equivalent for the ears 9' just mentioned. It may be desired at times to use a greater number of traction blades than spokes, and in that event I insert anchors 8 between each two spokes 2 and 3, these anchors being of sufficient thickness to fit closely between the inner rings 6 and 6' and being riveted in place as shown in Fig. 1. Said anchors project beyond the outer edges or peripheries of these rings and are notched as indicated at 8' so that the notches receive and support the blades 9 whether the latter are individual or convoluted. Where each blade passes each spoke I employ a U-shaped bolt or clip 10, its bend passing around the spoke and its arms passing through the blade and receiving nuts as shown.

In cultivating crops or passing over sod when the ground is soft, the machine should not be permitted to sink into the same. Accordingly I provide broad treads in the shape of supplemental tires 12, each capable of being slipped over the outer end of the wheel so as to inclose one of the outer rings 7' while yet leaving the arched centers of the blades 9 uncovered so that the wheel may possess sufficient tractive qualities.

When the ground is frozen hard or ice is to be crossed, means are desirable for preventing slipping or skidding. I accordingly provide narrow tires 14, each thickly studded with calks or points 15, these tires being of sufficient size to pass around the arched centers of the blades 9 and around the extremities of the spokes. Obviously this device, like the supplemental tire 12, may be removed when the need for it no longer exists.

For use in very sandy soil, the rings 6 and 6' and 7 and 7' may be made of angle steel, as shown in Fig. 5.

Other structural changes and modifications would suggest themselves to the manufacturer equipped for such work, and may be adopted without departing in any way from the spirit of my invention.

The above described traction wheel is adapted to give the maximum tractive pull with the minimum weight in the tractor as a whole, when used without the supplemental tires. And it could be so used in breaking the ground, preparing the seed bed and seeding, when drills and other heavy draft machines were used. Also, the light weight possible in the tractor on which these wheels are used and the addition of the broad supplemental tires enables the machine to remain on the surface without unduly compacting the soil or disturbing the roots in cultivating such crops as corn.

The shaft driven wheel is preferable; because it admits of the construction which will most readily clear itself of soil and trash. However the wheel may turn on an axle and be driven by a gear, sprocket or other devices attached to its inner series of spokes.

Having thus described my invention, what I claim as new and desire to secure by Letters Patent, is—

1. The herein described traction wheel comprising a hub, two series of spokes radiating therefrom and converging toward each other, a rim composed of a pair of inner rings between which the spoke-ends project and a pair of spaced outer rings, transverse traction blades secured to the inner faces of the outer rings and arched over the outer edges of the inner rings, and means for securing the projecting ends of the spokes to said blades.

2. The herein described traction wheel comprising a hub, spokes radiating therefrom, a pair of inner rings between which the outer ends of said spokes project, a pair of outer rings spaced from the inner rings, transverse traction blades having their ends bolted to the outer rings and their centers passing over the inner rings and alongside said spokes, and U-shaped fastening elements whose centers embrace the spoke-ends and whose arms are secured to said blades, for the purpose set forth.

3. The herein described traction wheel comprising a hub, two series of spokes radiating therefrom and converging toward each other, a pair of smaller inner rim-rings between which the outer ends of said spokes project, a pair of larger outer rim-rings spaced from the inner rings, transverse traction blades having deflected ears at their ends bolted to the inner faces of the outer rings, with their centers passing over the outer-edges of the inner rings and alongside said spokes, and U-shaped bolts whose centers embrace the spoke-ends and whose arms pass through said blades, for the purpose set forth.

4. The herein described traction wheel comprising a hub, spokes radiating therefrom, a pair of inner rim-rings between which said spokes project, anchors riveted between said rings and interposed between the spokes, the anchors being provided with notches in their projecting portions, a pair of larger outer rim-rings, and transverse traction blades connected at their ends with the outer rings and passing across the inner rings, certain blades being connected with the projecting spoke-ends and the remaining blades passing through said notches.

5. In a traction wheel, the combination with the hub, spokes, and a rim made up of side rings and transverse arched traction blades connecting them, the blades being connected with the outer ends of the spokes; of a flat supplemental tire of a size to pass over one ring but not to inclose the arched portion of said blades.

6. In a traction wheel, the combination with the hub, spokes, and a rim made up of side rings and transverse arched traction blades connecting them, the blades being connected with the outer ends of the spokes; of an anti-skid tire of a size to inclose the arched portion of said blades.

CHARLES H. MILLER.

Witnesses:
J. H. BYERS,
W. E. MILLER.